(12) United States Patent
Butler, Jr.

(10) Patent No.: US 7,623,966 B2
(45) Date of Patent: Nov. 24, 2009

(54) SYSTEM AND METHOD FOR PROVIDING INFORMATION TO TRAVELERS

(75) Inventor: Raymond O. Butler, Jr., Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 651 days.

(21) Appl. No.: 11/056,904

(22) Filed: Feb. 11, 2005

(65) Prior Publication Data
US 2006/0184313 A1    Aug. 17, 2006

(51) Int. Cl.
G01C 21/00 (2006.01)
G01C 21/30 (2006.01)

(52) U.S. Cl. ..................... 701/213; 701/200
(58) Field of Classification Search ............. 701/200, 701/213
See application file for complete search history.

(56) References Cited

U.S. PATENT DOCUMENTS

| 5,767,795 | A | * | 6/1998 | Schaphorst | 340/988 |
| 5,987,383 | A | * | 11/1999 | Keller et al. | 701/213 |
| 6,374,180 | B1 | * | 4/2002 | Slominski et al. | 701/208 |
| 7,071,842 | B1 | * | 7/2006 | Brady, Jr. | 340/988 |
| 7,149,625 | B2 | * | 12/2006 | Mathews et al. | 701/209 |
| 2004/0204821 | A1 | | 10/2004 | Tu | |
| 2004/0243307 | A1 | * | 12/2004 | Geelen | 701/213 |
| 2005/0108213 | A1 | * | 5/2005 | Riise et al. | 707/3 |
| 2006/0184313 | A1 | * | 8/2006 | Butler, Jr. | 701/200 |
| 2007/0233384 | A1 | * | 10/2007 | Lee | 701/213 |

FOREIGN PATENT DOCUMENTS

| WO | 02/50495 | 6/2002 |
| WO | 2004/038446 | 5/2004 |

OTHER PUBLICATIONS

EP Search Report dated Jun. 28, 2006.
Communication from European Patent Office for European Application No. 06075226.8—2220, May 16, 2007 (13 pages).
EP Search Report dated Sep. 7, 2006.

* cited by examiner

Primary Examiner—Mark Hellner
Assistant Examiner—Helal A Algahaim
(74) Attorney, Agent, or Firm—Jimmy L. Funke

(57) ABSTRACT

Systems and methods for providing "point of interest" information to travelers. Large databases can be populated with information relating to a wide variety of different "points of interest." Individual users can use the system to automatically focus on information that is likely to be interesting to the user, while ignoring information that is unlikely to be interest to the user. The position of the user can influence which "points of interest" on the database are selectively identified by the system.

20 Claims, 6 Drawing Sheets

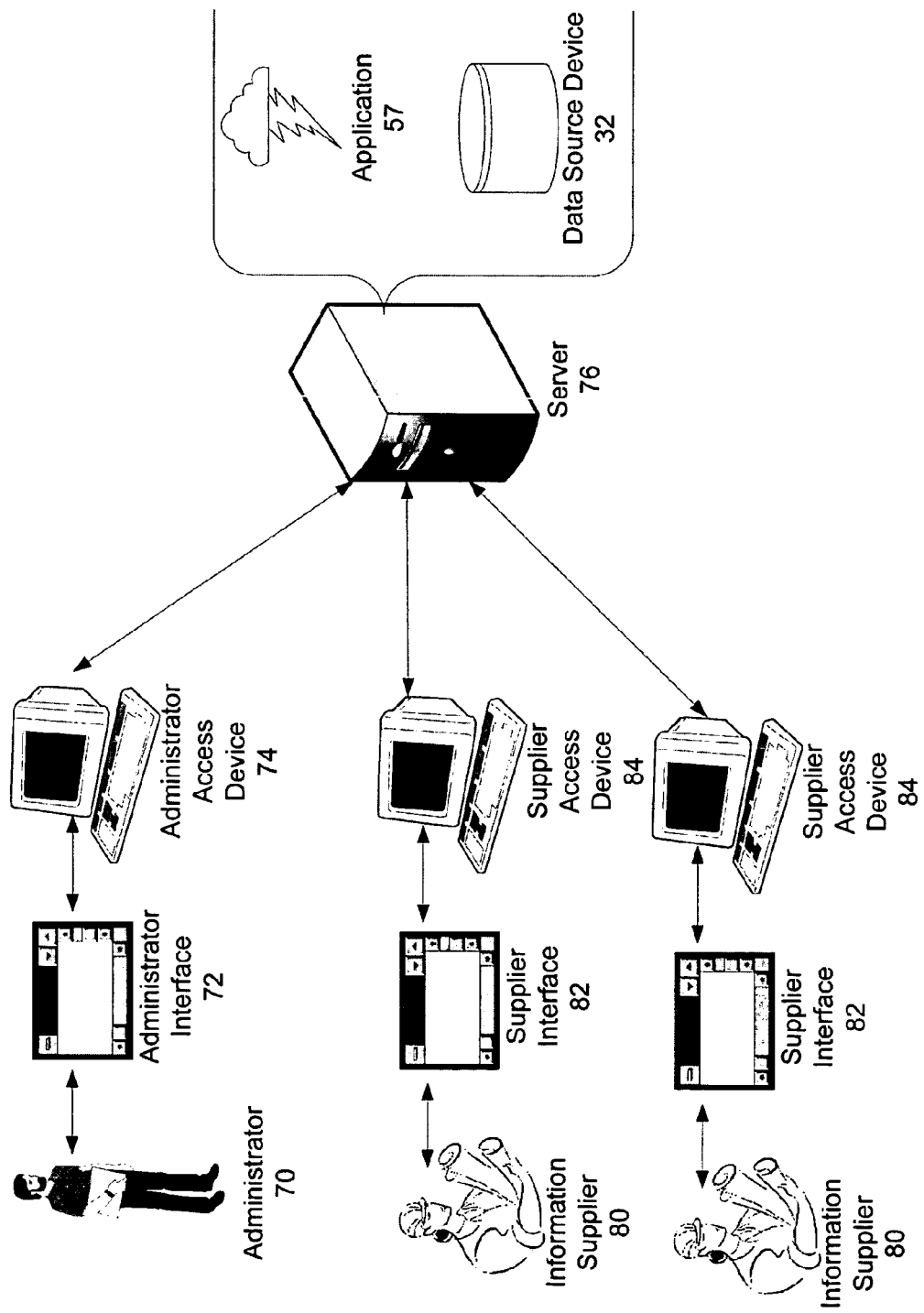

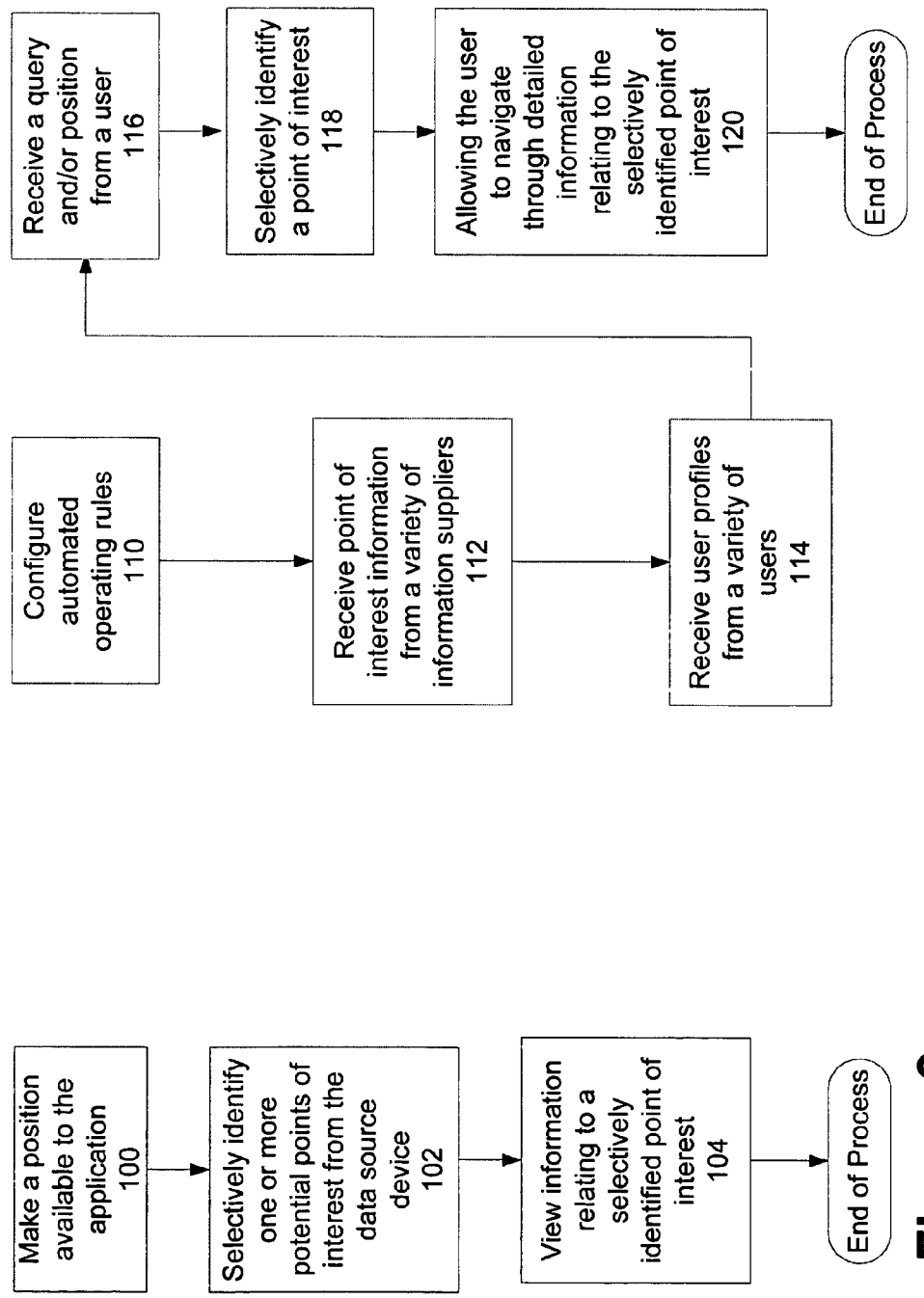

US 7,623,966 B2

SYSTEM AND METHOD FOR PROVIDING INFORMATION TO TRAVELERS

BACKGROUND OF THE INVENTION

The invention relates generally to systems and methods (collectively the "system") for providing information to travelers. More specifically, the system provides "point of interest" information to travelers.

Business travelers, vacationers, and other types of travelers (collectively "travelers") often miss opportunities to visit nearby "points of interest" on their journeys. Even in circumstances where a traveler sees a road sign pointing out a particular "point of interest" the traveler is often unable to obtain additional information without actually visiting the "point of interest." The risk that the "point of interest" may ultimately be closed, too expensive, not of interest, or otherwise undesirable will often dissuade the traveler from risking the investment of time and effort to visit. The inability of travelers to obtain the information they desire negatively impacts the various businesses, communities, organizations, and other entities that benefit from travelers visiting "points of interest."

The challenge of information access is compounded by the adverse impact of "noise" e.g. voluminous amounts of information that are not of interest to the particular traveler. It is often difficult for travelers to access detailed information about "points of interest" in a timely manner without also sifting through a voluminous amount of information that is not of interest.

It would be desirable to provide travelers with more effective mechanisms and methods for drilling down to detailed information that is of interest, while simultaneously more effectively allowing travelers to filter out information that is not of interest. The prior art does not appear to teach or even suggest such a system or method.

SUMMARY OF THE INVENTION

The invention relates generally to systems and methods (collectively the "system") for providing information to travelers. More specifically, the system provides "point of interest" information to travelers.

A position device can be used to identify a position of the traveler. The position of the traveler can be used to assist the process of selectively identifying points of interest for the particular traveler. For example, points of interest that are outside a particular travel range can be excluded or filtered out from the consideration of the traveler.

A data source device can be used to store information relating to various points of interest, such as the respective locations of the "points of interest." Different embodiments of the system can involve a wide variety of different types and quantity of information. In some embodiments, the data source device travels with the traveler, such as a CD, DVD, or other stand alone memory unit. In other embodiments, the data source device can be accessed remotely by the traveler.

An access device can be used to selectively identify one or more points of interest using the position of the traveler. The access device can also be used to provide information about any point of interest selected by the traveler.

The present invention will be more fully understood upon reading the following detailed description in conjunction with the accompanying drawings.

BRIEF DESCRIPTION OF THE DRAWINGS

FIG. 6 is a multi-threaded process flow diagram illustrating examples of administrators and information suppliers interacting with an application used to provide the functionality of the system.

FIG. 9 is a process flow diagram for selectively identifying a point of interest.

FIG. 10 is a process flow diagram for providing the functionality of the system.

DETAILED DESCRIPTION

I. Overview and Introduction of Elements

The invention relates generally to systems and methods (collectively the "traveler information system" or simply the "system") for providing information to travelers. More specifically, the system provides "point of interest" information to travelers.

Figure 1:
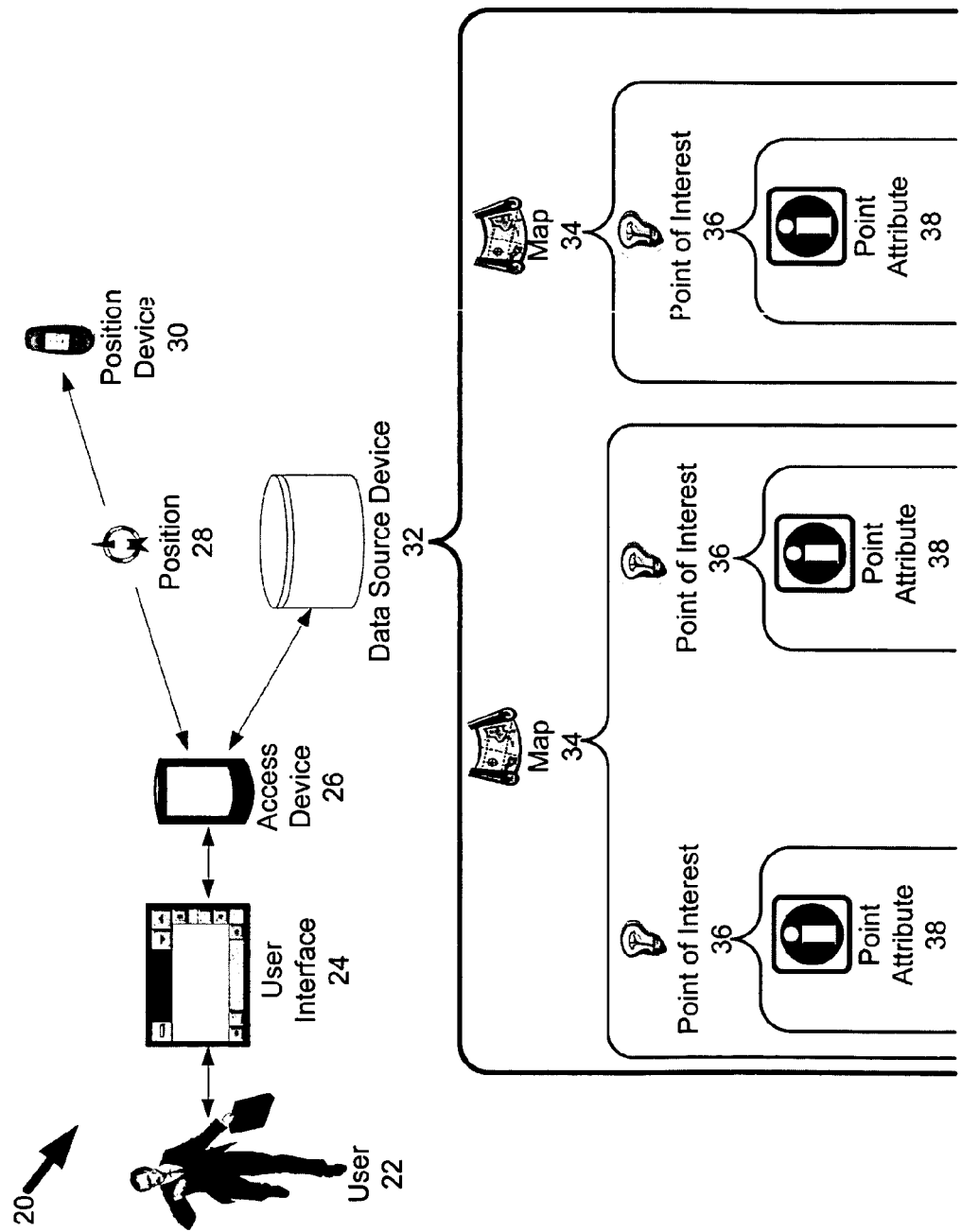
FIG. 1 is a block diagram illustrating some examples of elements that can be included in the system.

FIG. 1 is a block diagram illustrating some examples of elements that can be included in a traveler information system 20.

A. User

A user 22 is the person receiving information from the system 20. The user 22 can also be referred to as the traveler. In most embodiments, the user 22 will be a human being. However, in some embodiments, the user 22 could be a robot, an automated vehicle, or some type of artificial intelligence device. Numerous different users 22 can access the system 20 in a simultaneous or substantially simultaneous manner.

Although only one user 22 is illustrated in the Figure, the system 20 can interact with multiple users 22 in a simultaneous or substantially simultaneous manner.

Users 22 interact with the system 20 through a user interface 24.

B. User Interface

A user interface 24 is the mechanism by which the user 22 interacts with an access device 26. Different embodiments of the system 20 can involve vastly different user interfaces 24. User interfaces 24 can include graphical user interfaces, web pages, voice recognition technology, and any other type of interface that can support the interaction of the user 22 with the access device 26 (collectively "user interfaces" 24). User interfaces 24 capture user 22 inputs for the purposes of system 20 processing, while also making the outputs generated by the system 20 accessible to the user 22.

Some access devices 26 can support more than one type of user interface 24. For example, a single access device 26 could provide for receiving voice commands from users 22 and providing users 22 with information in an audio format while the user 22 is driving the vehicle, while providing a graphical user interface to that same user 22 if the user 22 is not currently driving the vehicle.

User interfaces 24 interact with other components of the system 20 through access devices 26. User interfaces 24 are made available to users 22 through access devices 26.

C. Access Device

An access device 26 is potentially any type of device that can provide the user 22 with information provided by the system 20. Examples of access devices 26 can include but are not limited to laptop computers, hand held computers, embedded computers, cell phones, satellite pagers, personal digital assistants, satellite receivers, embedded navigation systems, dashboard instrumentation, and any other device capable of making the user interfaces 24 accessible to the users 22.

In some embodiments, the access device 26 can the same device as a position device 30 and/or a data source device 32, both of which are discussed below. If the access device 26 is separate from the position device 30 and the data source device 32, it should be able to communicate with those devices. In a preferred embodiment, the access device 26, the position device 30, and the data source device 32 are in real-time or substantially real-time communication with each other. Access devices can "display" information in a variety of different formats through a variety of different senses. For example, information can be "displayed" (e.g. communicated to the user 22) visually, orally, etc.

D. Position

A position 28 is a geographic attribute relating to the position device 30. Different embodiments of the system 20 can involve different formats for positions 28. For example, a position 28 could be a street address, a set of coordinates, a distance and direction from a predefined location, or any other information that can serve as indicia for a position or location (collectively a "position" 28). In a preferred embodiment, the position 28 is a set of coordinates captured using a global positioning system ("GPS").

The position 28 relates to the location of the position device 30. As discussed below, the position device 30 is often housed or even embedded in a vehicle. In those embodiments, the position 28 relates to the vehicle. In other embodiments, the position device 30 can be carried by the user 22 in which case the position 28 would relate to the user 22. The position 28 of the position device 30 can be used to filter out information that is too far away to be useful while identifying or even highlighting information that relates to points of interest close to the vicinity of the user 22.

In some embodiments of the system 20, the position 28 can also be associated with a heading (e.g. a direction of travel or a destination), a route (e.g. a specific path towards a destination), and/or a velocity (e.g. a speed at which the user 22 is moving towards the heading and/or along the route.

E. Position Device

A position device 30 is any device used to identify or capture the position 28. In one embodiment, the position device 30 is a global positioning system ("GPS"). Other positional applications are well known in the art, and the system 20 can use those applications as well as accommodate future position detection technologies. In some embodiments, the position device 30 is the same device as either the access device 26 and/or the data source device 32.

The position device 30 identifies the position 28 and makes that information available to the system 20. In a typical embodiment, the position 28 is sent to the access device 26. In some embodiments, the position 28 can be sent to the data source device 32 in order to immediately narrow the scope of information made available to a particular user 22 at a particular position 28.

In some embodiments, the position device 30 is a vehicle security device. In some embodiments, the position device 30 can capture a heading and/or a velocity as well as a position 28.

F. Data Source Device

A data source device 32 is any device or combination of devices used to store information relating to one or more points of interest 36 (described below). In many embodiments, the data source device 32 will include one or more databases, such as relational, object-oriented, or hierarchical databases. In some embodiments of the system 20, there is a centralized data source device 32 that is accessed remotely by various users 22. In other embodiments, a data source device 32 is housed or even embedded into the vehicle. For example, a CD-ROM or DVD could function as a data source device 32.

Different configurations and embodiments of data source devices 32 are described in greater detail below.

G. Map

A map 34 is a representation (typically a graphical representation) of a geographical area. Different maps 34 can cover different areas as well as different levels of scope. In some embodiments of the system 20, all points of interest 36 can be located on a single map 34. In other embodiments, there will be multiple maps 34 focusing on different geographical areas. Maps 34 can overlap with each other. One map 34 can include the geographical areas of multiple other maps 34. Although only two maps 34 are shown in FIG. 1 due to space constraints, the system 20 can include numerous maps 34.

H. Point of Interest

A point of interest 36 can be a site, attraction, tourist spot, sports arena, monument, museum, statue, historical landmark, amusement park, travel destination, historical building, natural landmark, famous site of a crime or disaster, or any other item that could be a user 22 could find to be of interest to one or more users 22. In some embodiments of the system 20, purely functional stops such as gas stations, hotels, and restaurants are not included as points of interest 36.

Points of interest 36 can also be referred to as items of interest, items, or in some contexts, a point of interest 36 can also be referred to as potential point of interest 36. Users 22 of the system 20 determine which potential points of interest 36 are actually of interest in a particular context.

Points of interest 36 can be created, modified, deleted, stored, and accessed using the system 20. A point of interest 36 can be associated with one or more point attributes 38. A wide variety of information and data related to a point of interest 36 can be created, modified, deleted, stored, and accessed as point attributes 38.

The system 20 can store a voluminous number of points of interest 36 in one or more data source devices 32. Users 22 of the system 20 filter out points 36 that are not of interest, selectively identifying the points 36 that are of interest. The process of selective identification typically involves a point attribute 38 associated with the selectively identified point of interest 36.

In the example provided by FIG. 1, no map 34 is shown with more than two points of interest 36. However, a single map 34 can include a virtually unlimited number of points of interest 36.

I. Point Attribute

A point attribute 38 is a unit of information associated with points of interest 36. There are many different types of point attributes 38, some of which are discussed below. In the aggregate, point attributes 38 can be referred to as travel information.

II. Different Types of Travel Information

Figure 2:
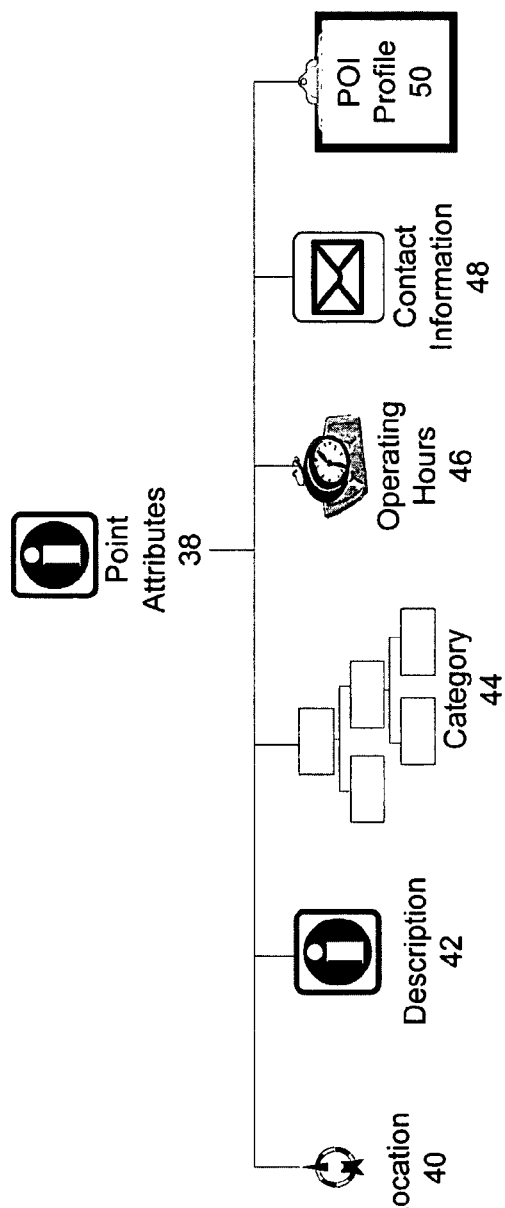
FIG. 2 is a hierarchy diagram illustrating examples of point attributes.

FIG. 2 is a hierarchy diagram illustrating examples of different types of point attributes 38. A single point of interest 36 can be associated with multiple types of point attributes 38.

A. Location

A point of interest 36 can be associated with one or more locations 40. A location 40 is a geographical attribute associated with the point of interest 36. in some embodiments, the location 40 includes the coordinates that would be generated by a global positioning system ("GPS"). In other embodiments, the location 40 could include a mailing address or some other metric indicating the location 40 of the point 36. In many embodiments of the system 20, the location 40 and the position 26 will be captured in compatible units of measure so that it is easier to compare and/or contrast the two geographical metrics. It is typically desirable for the system 20 to "factor in" the distance between the user's position 26 and the location 40 of the potential point of interest 36 to determine whether or not the potential point of interest 36 is actually of interest to the user 22.

B. Description

A point of interest 36 can be associated with one or more descriptions 42. Descriptions 42 can include information in the form of text, sound, graphics, video, and even smell. Descriptions 42 typically include some type of narrative relating to the applicable point of interest 36. Descriptions 42 can include multiple different formats of information to accommodate different types of access devices 26. For example, some access devices 26 may rely exclusively on oral communication such as a recording of spoken words, while other access devices 26 may incorporate sophisticated graphics and video.

Descriptions 42 could be displayed on a screen or provided over an audio speaker. For example, while driving by a famous building, the speakers in the vehicle could play a description 42 of the building, including information about the architects, builders, etc. as if the user 22 where on a site seeing tour. The description 42 could be accompanied by background music appropriate to the era in which the building was constructed. Descriptions 42 can include technologies and techniques in the known art of tours and site seeing. In many contexts, the system 20 can serve as an automated tour guide for the user 22

C. Category

In order to assist users 22 in focusing on points 36 that are actually of interest to those users 22, the various points 36 in the data source device 32 can be organized by category 44. In some embodiments, the system 20 is organized into a hierarchy of categories 44. For example, civil war sites could be a sub-category of historical landmarks. By organizing points of interest 36 into categories, different users 22 can more effectively filter out points 36 that are not of interest to their individual tastes. In an application service provider ("ASP") embodiment of the system 20, the ASP provider can update the hierarchy of categories from time to time as the needs of the ASP subscribers change and the information content of the system 20 evolves.

D. Operating Hours

Some points of interest 36 can be associated with one or more operating hours 46. For example, a museum is only open certain hours of the day. Even points of interest 36 such as a public park or beach that do not charge admission can be associated with one or more operating hours 46. The system 20 can be configured to automatically filter out or ignore nearby points of interest 36 if the operating hours 46 are inconsistent with the current time and place of the user 22 or vehicle. Some points of interest 36 will not be associated with any type of operating hours 46.

E. Contact Information

Points of interest 36 can be associated with contact information 48, such as a phone number, a fax number, a radio frequency, a CB channel, an e-mail address, a website, a mailing address, or potentially any other information that can assist users 22 in obtaining additional information about a point of interest 36. By including contact information 48 relating to an applicable point of interest 36, the system 20 enhances the ability of users 22 to access information not stored as point attributes 38 on the system.

F. POI Profile

A point of interest 36 can be associated with a point of interest profile ("POI profile") 50 for the purpose of facilitating the automated processing of the system 20. The POI profile 50 can include the selections and preferences of the information supplier associated with the particular point of interest 36. Information suppliers are discussed in greater detail below. The selections and preferences of the information supplier relate to and interact with the processing rules of the system 20.

In an ASP embodiment of the system 20, the POI profile 50 can include elements of the agreement between an information supplier associated with the point of interest 36 and the ASP of the system 20. For example, certain points of interest 36 could be given more favorable treatment by the system 20 based on the agreement between the information supplier and the ASP.

III. Input/Output View

Figure 3:
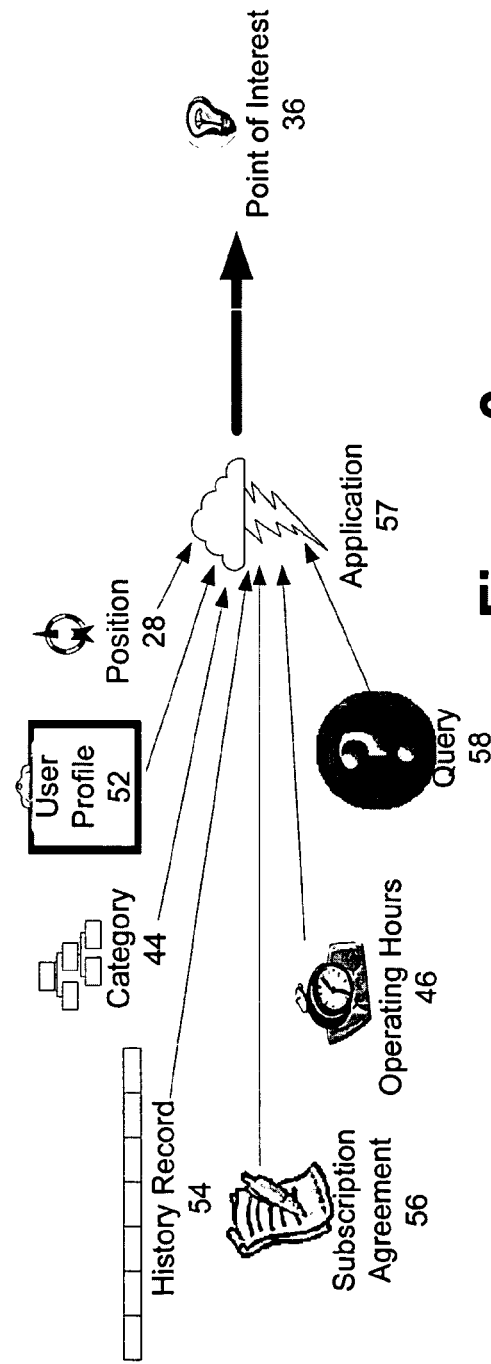
FIG. 3 is an input-output diagram illustrating examples of different processing elements that can influence the selective identification of a point of interest.

FIG. 3 is an input-output diagram illustrating examples of different processing elements that can influence the selective identification of a point of interest 36 from the potentially voluminous number of potential points of interest 36 stored by the system 20.

Different types of events can trigger, activate, or otherwise cause (collectively "triggering events" or simply "triggers") the system 20 to perform the selective identification process.

Some triggers can be referred to as active triggers. For example, a user 22 could submit a query 58 (discussed below) to determine whether or not the user 22 would be driving by any historical landmarks. The submission of the query 58 would cause the system 20 to immediately initiate the process of selectively identifying points of interest 36 from the libraries of data stored on the data source device 32.

Other triggers can be referred to as passive triggers or ongoing triggers. Such triggers can be thought of as "standing instructions" that are not limited to a particular instance of time. For example, a user profile 52 (discussed below) could be configured to automatically notify the user 22 whenever the user 22 is or will be within a certain distance of a museum. Passive triggers can be based on a single input factor or any combination of input factors. Passive triggers can incorporate a "sliding scale" as to whether or not a selective identification process is to be invoked. For example, if two points of interest 36 are both just outside a predefined range of interest, the fact that there are two points 36 and not merely one point 36 could be used to lower the bar for triggering the process of identifying travel information for the user 22. In some ways, a passive trigger can be thought of a delayed query 58 or a query 58 that is automatically submitted by the system 20 in accordance with the automated operating rules of the system 20.

In addition to the numerous different triggering events that can be configured into the system 20, different embodiments of the system 20 can also involve significantly different numbers and types of inputs in the process of selectively identifying one or more points 36 from all of the points of the interest 36 stored in the data source device 32. Furthermore, different embodiments of the system 20 may weigh the various input factors differently.

A. Position

As discussed above, the position 28 is a geographical attribute relating to the position device 30, which is in turn associated with either the user 22 or a vehicle that includes the user 22. In some embodiments, the position 28 can be a street address. In other embodiments, the position 28 can be in the form of coordinates. It can be useful to calculate the distance between the position 28 and the locations 40 of potential points of interest 36 in the selective identification process. The selective identification process can also be referred to as a filtration process or a focus process. In some embodiments, the heading (discussed above) of the user 22 is used in conjunction with the position 28 to impact the selective identification of the points of interest 36, B. User Profile Each user 22 can be associated with one or more user profiles 52. For example, a user 22 could have one user profile 52 associated with business travel, a second user profile 52 associated with vacation travel, and a third user profile 52 associated with family vacation travel.

The system 20 can be configured to automatically influence which points of interest 36 are likely to be of interest based on the applicable user profile 52.

User profiles 52 are typically user defined to a significant degree. In some embodiments, the system 20 can automatically modify the user profile 52 based on the particular user's 22 interaction with the system 20. In other embodiments, only express selections and communications by the user 22 can influence the user profile 52.

In an ASP embodiment of the system 20, the subscription agreement between the user 22 and the ASP can influence the user profile 52.

C. Category

Categories 44 associated with the various points 36 can be used to influence the process of selectively identifying one or more points of interest 36. Categories 44 of points can be matched with categories within the applicable user profile 52, an applicable history record 54, an applicable subscription agreement 56, and/or a query 58 submitted by the user 22.

Categories 44 are particularly powerful in the context of user queries 58, discussed below. A user 22 seeking information about Native American burial sites can use a query 58 to exclude all points 36 not relating to the desired category 44.

D. History Record

The system 20 can be configured to store the history of a particular user's 22 interactions with the system 20. Such information is stored in one or more history records 54.

History records 54 can be used to influence the process of selectively identifying points of interest 36 from all of the points of interest 36 data stored within the data source device 32.

History records 54 can be particularly effective and influential in situations were the desires of the user 22 are not expressed in the form of a query 58 or in situations where the query 58 is itself ambiguous. For example, a query 58 of "race track" could refer to a wide variety of different types of automobile, boat, go-cart, motorcycle, horse, and dog racing. History records 54 relating to the user 22 could be used to further narrow the pool of points 36 considered to be of interest. For example, it may be possible to determine from prior user interactions (recorded in history records 54) that the interest of the user 22 is limited exclusively to horse racing.

E. Subscription Agreement

In some embodiments of the system 20, users 22 subscribe to a service provider to obtain the benefits of the system 20. In subscription embodiments, the terms of the subscription agreement 56 can influence the process of selectively identifying points of interest 36 from all of the points of interest 36 data stored within the data source device 32. Subscription agreements 56 can distinguish between points 36 in the data source device 32 using potentially any of the point attributes 38 processed by the system 20.

For example, different subscription agreements 56 could impact which maps 34 a particular subscriber has access too. In some embodiments of the system 20, the subscriptions are based on geographical subunits such as regions of the country, states, cities, or even portions of a city.

F. Operating Hours

In some embodiments of the system 20, the operating hours 46 associated with a particular point of interest 36 can automatically influence whether or not that particular point of interest 36 is removed from consideration as being potentially of interest to the user 22 at a particular time. Such a process would typically involve determining if the user 22 has a realistic opportunity to visit the point of interest 36 while the point of interest 36 is allowing visitors. This determination can be influenced by time, distance, and the rate of speed in which the user 22 is traveling.

Operating hours 46 can also be used to prioritize the points 36 that are selectively identified as being of interest to the user 22.

G. Query

A query 58 is any input by the user 22 that has a one-time only impact. In other words, any information submitted by the user 22 that does not relate to the user profile 52, the subscription agreement 56, or some other input factor that survives beyond one selective identification process can be considered to be a query 58. Different embodiments of the system 20 can support different types of queries 58. In some embodiments, queries 58 can include compound input factors that relate to particular types of point attributes 38. For example, a query 58 could include a geographical region or location 40, a category 44, a time of day, or any other type of information or point attribute 38.

Queries 58 are typically either typed into some type of controller, or are captured by some type of voice or speech recognition device. Different access devices 26 and user interfaces 24 will can involve different types and formats of queries 58.

The input factors used by the system 20 are provided to an application 57. The application 57 includes the instructions or programming logic that supports the functionality of the system 20. Different embodiments of the system 20 may involve substantially different application architectures. The application 57 is responsible for the programming logic that defines the process of selectively identifying a subset of points of interest 36 from the library of data stored on the data source device 32. The output from the application 57 includes one or more points 36 deemed to be of interest. In some embodiments, it is possible that the application 57 will consider no points 36 to be of interest. In alternative embodiments where interest is evaluated on a relative basis, the system 20 could identify the point 36 or points 36 most likely to be of interest. Such an embodiment of the system 20 could include a probability metric representing the probability that the particular point 36 would be deemed to be of interest to the user 22.

In some embodiments of the system 20, the processing rules that influence the selective identification process are themselves influenced by the selections, determinations, and preferences of users 22, information suppliers, and ASPs.

IV. Remote Data Source Embodiment

Figure 4:
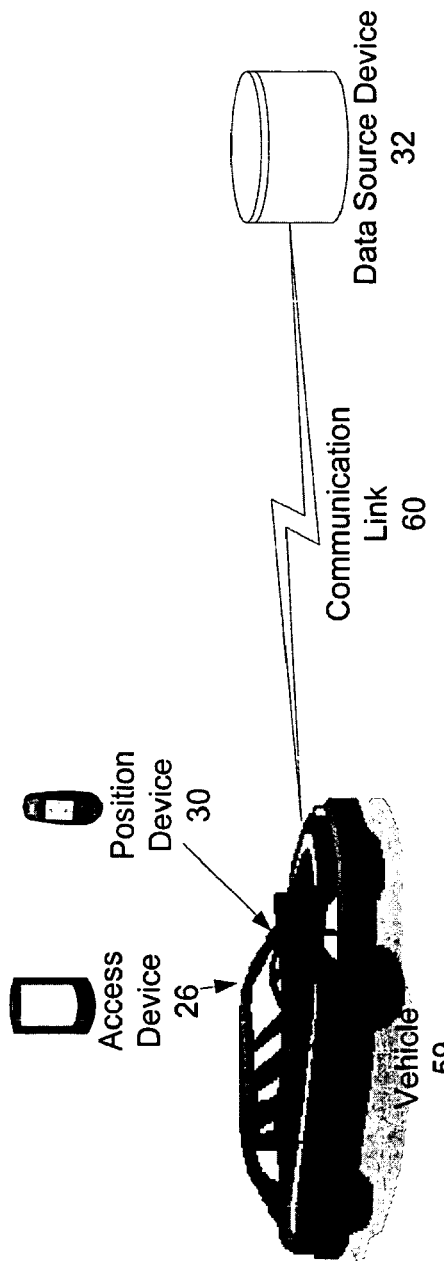
FIG. 4 is block diagram illustrating an example of an embodiment of the system where the data source device is remote from the vehicle, and where a communication link is used to exchange information between the data source device and the other system components that are housed within the vehicle.

FIG. 4 is block diagram illustrating an example of an embodiment of the system 20 where the data source device 32 is remote from a vehicle 59, and where a communication link 60 is used to exchange information between the data source device 32 and the components of the system 20 housed in the vehicle 59.

In the example in FIG. 4, the communication link 60 could be transmitted over a wide variety of different communication technologies, such as wireless (including but not limited to Wi-Fi), cellular, satellite, or any other communication technique capable of supporting a mobile vehicle 59 or access device 26.

The access device 26 located within the vehicle so that it is accessible to the driver or alternatively, to one or more passengers. In some embodiments, the access device 26 is movable within and even outside of the vehicle 59. The position device 30 can be at any location on or in the vehicle 59 so long as the position device 30 can communicate with the access device 26.

The data source device 32 of FIG. 4 is typically a database housed on a server.

The vehicle 59 illustrated in the example of FIG. 4 is an automobile. Other examples of vehicles 59 can include planes, boats, helicopters, submarines, motorcycles, bicycles, skateboards, go-carts, or any other type of transportation device. Some embodiments of the system 20 do not require a vehicle 59. For example, the data source device 32, the access device 26, and the position device 30 could be carried by a user 22 traveling by foot.

V. Integrated Data Source Embodiment

Figure 5:
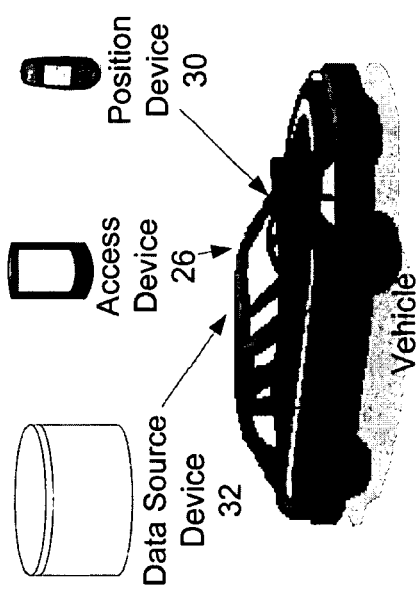
FIG. 5 is a block diagram illustrating an example of an embodiment of the system where the data source device, the access device, and the position device are housed within the vehicle.

FIG. 5 is a block diagram illustrating an example of an embodiment of the system 20 where the data source device 32, the access device 26, and the position device 30 are housed or even potentially embedded within the vehicle 59.

Unlike the example of FIG. 4, the embodiment of the system 20 in FIG. 5 involves a data source device 32 located on the vehicle 32. In such an embodiment, the data source device 32 could be embodied in a wide variety of different tangible mediums, such as a CD-ROM, a DVD, a floppy disk, an internal or flash memory card, a hard drive, or some other stand alone memory unit. Typically, the service provider of the system 20 would copy portions of the data from a data database to the stand alone memory unit for distribution to subscribers (e.g. users 22).

In some embodiments of the system 20, the data source device 32 can be updated while it is within the vehicle 59, and even while the vehicle 59 is in motion. A communication link 60 (as discussed above and illustrated in FIG. 4) could be used to update the contents of the data source device 32 within the vehicle 59.

In embodiments of the system 20 where a data source device 32 is not remote from the access device 26 and the position device 30, there will often be some type of centralized data storage depository, such as a database residing on a server operated by an ASP. The tangible media used to locally store the information for access by the access device 26 and position device 30 can be full or partial copies from the data on the data storage depository.

VI. Information Suppliers and System Administration

FIG. 6 is a process flow diagram illustrating examples of administrators 70 and information suppliers 80 interacting with an application 57 used to provide the functionality of the system 20.

A. Administrators

An administrator 70 is a person responsible for managing the sustaining the functionality of the system 20. For example, the automated processing rules, algorithms, and heuristics for selectively identifying points of interest 36 can be defined, updated, and "saved" by administrators 70 of the system 20. In an ASP embodiment, the administrator 70 is typically an agent or employee of the ASP. An administrator 70 interacts with the system 20 through an administrator interface 72.

B. Administrator Interface

Any of the types of interfaces discussed above with respect to user interfaces 24 can serve as administrator interfaces 72. Administrator interfaces 70 will typically support more types of interactions than a user interface 24 because configuration of the system 20 is typically more complex than mere use of the system 20. The goal of making the system 20 easy and useful to access typically makes the administration of the system 20 more complex and challenging. The administrator interface 24 is used by the administrator 70 to interact with an administrator access device 74.

C. Administrator Access Device

Any of the access devices 26 discussed above can potentially constitute administrator access devices 74. The administrator access device 74 accesses the application 57 responsible for providing the functionality of the system 20 by interacting with a server 76 hosting the application.

D. Server

A server is any device or group of devices capable of hosting the application 57 needed to provide the functionality of the system 20 and accessing the point attributes 38 stored on the data source device 32.

E. Information Supplier

In some embodiments of the system 20, the operator of the system 20 (such as an ASP) is responsible for populating the data source device 32 with point attributes 38. In some embodiments, the system 20 can be configured to allow users 22 to function as an information supplier 80. However, in a typical embodiment, it can be beneficial to allow individuals and organizations who benefit from attendance at a point of interest 36 to function as information suppliers 80 for the system 20. Any corporation, government entity, church group, community group, individual, or any other entity (collectively "entity") interest in facilitating the spread of information on the system 20 can function as an information supplier 80.

Information suppliers 80 interact with the system 20 using a supplier interface 82.

F. Supplier Interface

Any of the types of user interfaces 24 discussed above could also potentially function as a supplier interface 82. In a typical embodiment, the supplier interface 82 will be a web page that allows information suppliers 80 to upload information relating to one or more points of interest 36.

Supplier interfaces 82 interact with the application 57 through a supplier access device 84.

G. Supplier Access Device

Any of the types of access devices 26 discussed above could also potentially function as a supplier access device 84. In a typical embodiment, the supplier access device 84 is any device capable of accessing a web page.

The interactions between the application 57 and various information suppliers 80 are constrained and configured by the processing rules created, updated, activated, and stored by the administrator 70 through the administrator access device 74.

VII. Subsystem-Level View

Figure 7:
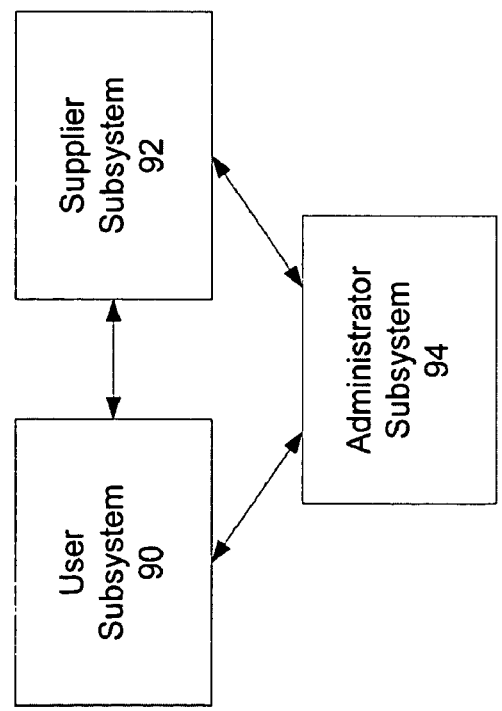
FIG. 7 is a block diagram illustrating a first subsystem-level view of the system.

FIG. 7 is a block diagram illustrating a first subsystem-level view of the system 20. The view of FIG. 7 is an illustration of an entity-based subsystem configuration of the system 20.

A. User Subsystem

A user subsystem 90 provides for all interactions between a particular user 22 and the system 20. Many of the input factors used to influence the process of selectively identifying points of interest 36 relate to the particularities of the user 22, including for example the position of the user 22, a user profile 52, a category 44 of interest to the user 22, a history record 54 storing an example of a past interaction between the user 22 and the system 20, a subscription agreement between the user 22 and the provider of the system 20, the time constraints of the user, and/or a query 58 submitted by the user 22.

All interactions, preferences, instructions, and information relating to the user 22 can originate from the user subsystem 90.\

B. Supplier Subsystem

A supplier subsystem 92 provides for all interactions between a particular information supplier 80 and the system 20. Typically, all of the point attributes 38 relating to a potential point of interest 36 will be provided, updated, and when necessary, deleted, by the information supplier 80 using the supplier subsystem 92.

C. Administrator Subsystem

An administrator subsystem 94 provides for all interactions between administrators 70 and the application(s) 57 providing the functionality of the system 20. All of the processing rules of the system 20, including the various algorithms, heuristics, and other processes for influencing how points of interest 36 are selectively identified from the data source device 32 can be created, updated, stored, and activated using the administrator subsystem 94. In some embodiments of the system 20, administrators 70, information suppliers 80, and even users 22 can be given the ability to dynamically change their preferences, dynamically altering the processing rules of the system 20 in accordance with the processing rules of the system 20.

Figure 8:
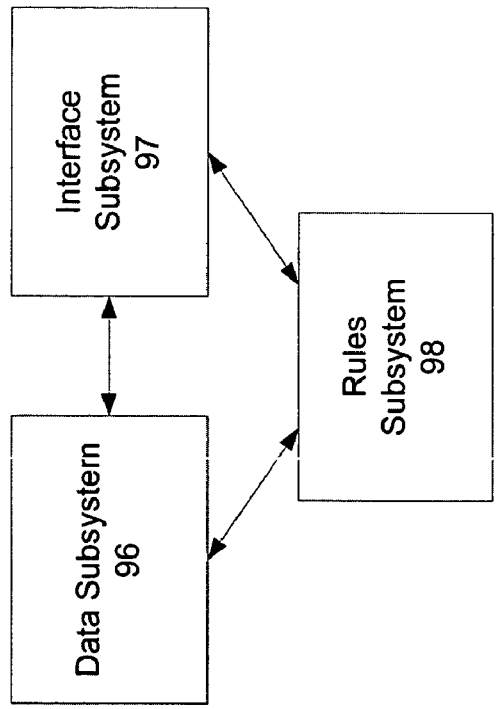
FIG. 8 is a block diagram illustrating a second subsystem-level view of the system.

FIG. 8 is a block diagram illustrating a second subsystem-level view of the system 20. FIG. 8 is a subsystem-level view that is function-based instead of entity-based.

D. Data Subsystem

A data subsystem 96 provides for receiving, storing, updated, and if necessary, deleting, all information stored on the data source device 32. The types of point attributes 38 stored and processed by the data subsystem 96 can be configured by processing performed using a rules subsystem 98.

E. Interface Subsystem

An interface subsystem 97 provides interfaces for users 22, administrators 70, and information suppliers 80 to interact with the system 20. The interface subsystem 97 interacts with the data subsystem 96 to access point attributes 38 in accordance with the rules configured through interactions between the interface subsystem 97 and a rules subsystem 98.

F. Rules Subsystem

A rules subsystem 98 is responsible for creating, updating, and enforcing the processing rules of the system 20. The rules subsystem 98 configures and influences the ways in which points of interest 36 are selectively identified by the data subsystem 96. The rules subsystem 98 can also influence the functionality and available options of the various interfaces of the interface subsystem 97.

VIII. Process-Flow Views

A. Selectively Identifying a Point of Interest

FIG. 9 is a process flow diagram for selectively identifying a point of interest 36.

At 100, a position 26 is made available to the application 57.

At 102, one or more points of interest 36 are selectively identified.

At 104, information such as point attributes 38 relating to one of the selectively identified points of interest 36 can be viewed by the user 22.

The process then terminates, awaiting subsequent activation by a variety of different triggers, including prompting from a user 22, the passage of a predetermined period of time, travel over a predetermined distance, or a change made to a point attribute 38 by a information supplier 80.

B. Providing the Functionality of the System

FIG. 10 is a process flow diagram for providing the functionality of the system 20. It can include actions by a variety of entities, including users 22, administrators 70 and information suppliers 80.

At 110, automated operating or processing rules can be configured into the system 20. This is typically performed by one or more administrators 70 using one more administrator interfaces 72 and one or more administrator access devices 74. The processing and operating rules of the system 20 can be configured to permit the dynamic addition, modification, and expansion of those rules after the system 20 is operational for users 22.

At 112, information such as potential points of interest 36 and point attributes 38 relating to those potential points of interest 36 are used to populate the system 20. As indicated on FIG. 10, this processing is typically performed by information suppliers 80, although administrators 70 may be required to assist with the particularly significant uploads that would occur before the system 20 is operational for users 22.

At 114, users 22 can be invited to create, update, delete, and store user profiles 52. User profiles 52 processing can be performed by users 22 at any stage of system 20 processing and/or development.

At 116, a process for selectively identifying one or more points of interest 36 is invoked by the receipt of a query 58, the passage of a predetermined period of time, travel over a predetermined distance, or a change made to a point attribute 38 by a information supplier 80. In some embodiments, the system 20 automatically embeds the position 28 of the user 22 within the query 58 submitted by the user 22.

At 118, the system 20 selectively identifies one or points of interest 36 from the various points 36 and point attributes 38 stored on the data source device 32. An example of an input-output diagram for this process is disclosed in FIG. 3 and is discussed above.

At 120, the user 22 can interact with the selectively identified points of interest 36 and their accompanying point attributes 38. For example, the user 22 could obtain additional information as illustrated in FIG. 2 and discussed above.

The process then terminates, awaiting a subsequent action by an administrator 70, an information supplier 80, or a user 22.

IX. Alternative Embodiments

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

The invention claimed is:

1. A mobile system for accessing information about a point of interest, comprising:
    a position device, said position device configured to identify a position;
    a data source device, said data source device configured to provide:
        a plurality of points of interest;
        a plurality of point attributes, said plurality of point attributes including a plurality of locations;
        wherein each said point of interest is associated with at least one said point attribute;
    an application, said application comprising program logic configured to identify at least one of said plurality of points of interest stored on said data source; and
    an access device, said access device configured to:
        receive said position from said position device, wherein said position is a passive trigger that incorporates a sliding scale, and is based upon one of a single input factor and a combination of input factors that start a query automatically;
        selectively identify at least one said point of interest using said position and said application, wherein said sliding scale determines whether to invoke said selective identification; and
        communicate at least one said point attribute associated with said point of interest.

2. The mobile system of claim 1, wherein said position device is a global positioning system (GPS) and wherein said position includes a plurality of coordinates.

3. The mobile system of claim 1, wherein said system is housed in a vehicle.

4. The mobile system of claim 3, wherein said vehicle does not include said data source device.

5. The mobile system of claim 1, wherein the selectively identifying of at least one said point of interest is influenced by at least one of: (a) a distance between said position and at least one said location associated with at least one said selectively identified point of interest; (b) a user profile; (c) a history record; (d) a range of interest; (e) a category of interest; (f) a plurality of operating hours; (g) a user query received through said access device; and (h) a subscription agreement.

6. The mobile system of claim 1, wherein said data source device is a standalone memory unit.

7. The mobile system of claim 1, wherein said position device is located on a vehicle, wherein said access device is located on said vehicle, and wherein said data source device is not located on said vehicle.

8. The mobile system of claim 1, wherein said access device includes at least one of: (a) a laptop computer; (b) a notebook computer; (c) a personal digital assistant (PDA); and (d) a navigation application.

9. A mobile system for accessing information about a point of interest, comprising:
    a position device, said position device configured to identify a position and a heading;
    a data source device, said data source device configured to provide:
        a plurality of points of interest;
        a plurality of point attributes, said plurality of point attributes including a plurality of locations;
        wherein each said point of interest is associated with at least two said point attributes, including at least one said location;
    an application, said application, comprising program logic configured to identify at least one of said plurality of points of interest stored on said data source, said application comprising a probability metric representing a probability that an identified point of interest of said plurality of points of interest would be of interest to a user; and
    an access device, said access device configured to:
        receive said position and said heading from said position device, wherein said position is a passive trigger that incorporates a sliding scale, and is based upon one of a single input factor and a combination of input factors to start a query automatically;
        capture a user request;
        selectively identify at least one said point of interest using said position, said heading, said application, and said user request, wherein said sliding scale determines whether to invoke said selective identification; and
        display at least one said point attribute associated with said point of interest.

10. The mobile system of claim 9, further comprising a data supplier interface, said data supplier interface providing for adding and updating at least one said point of interest.

11. The mobile system of claim 10, wherein said data supplier interface is a website, wherein said data source device is a server supporting said website, and wherein said access device is located within a vehicle.

12. The mobile system of claim 9, wherein the selectively identifying of at least one said point of interest is influenced by at least one of: (a) a distance between said position and at least one said location associated with at least one said selectively identified point of interest; (b) a user profile; (c) a history record; (d) a range of interest; (e) a category of interest; (f) a plurality of operating hours; and (h) a subscription agreement.

13. The mobile system of claim 9, wherein said access device is located within a vehicle and wherein said data source device is updated while the vehicle is moving.

14. A method for providing information to travelers, comprising:
    receiving a plurality of points of interest from a plurality of information suppliers, wherein each said point of interest is associated with a location and a description, wherein said location and said description for each said point of interest is received through a network interface;
    storing a plurality of automated operating rules, wherein at least one automated operating rule is associated with a passive trigger that incorporates a sliding scale and is based upon one of a single input factor and a combination of input factors that start a query automatically;
    receiving at least one said input factor;
    selectively identifying one or more said points of interest, wherein said query, said automated operating rules, and said sliding scale influence the selective identification of one or more said points of interest, such that one or more said points of interest are determined to be of interest to a user based upon a probability metric; and
    providing at least one location and at least one said description to the user based upon said selective identification.

15. The method of claim 14, wherein an access device used to submit said query automatically embeds a plurality of coordinates with said query, and said query is a one-time selection of said one or more points of interest.

16. The method of claim 14, further comprising modifying a user profile, wherein said user profile further influences the selective identification of said point of interest.

17. The method of claim 14, wherein the access device used to submit said query and provide said location and said description to the user is embedded in a vehicle.

18. The method of claim 14, wherein said automated operating rules provide for at least one of: (a) a distance between said position and at least one said location associated with at least one said selectively identified point of interest; (b) a user profile; (c) a history record; (d) a range of interest; (e) a category of interest; (f) a plurality of operating hours; and (h) a subscription agreement.

19. The method of claim 14, wherein a stand-alone memory unit stores all said points of interest.

20. The mobile system of claim 1, wherein said application comprises a probability metric representing a probability that an identified point of interest of said plurality of points of interests would be of interest to a user.

* * * * *